United States Patent [19]
Bell

[11] Patent Number: 5,997,249
[45] Date of Patent: Dec. 7, 1999

[54] TURBINE, IN PARTICULAR STEAM TURBINE, AND TURBINE BLADE

[75] Inventor: Ralf Bell, Kerken, Germany

[73] Assignee: Siemens Aktiengesellschaft, Munich, Germany

[21] Appl. No.: 09/124,617

[22] Filed: Jul. 29, 1998

[30] Foreign Application Priority Data

Jul. 29, 1997 [EP] European Pat. Off. .............. 97113045

[51] Int. Cl.⁶ ....................................................... F01D 1/02
[52] U.S. Cl. .................................... 415/173.5; 415/173.6; 415/173.7; 415/174.5; 415/230; 416/189
[58] Field of Search ............................. 415/173.1, 173.5, 415/173.6, 174.5, 173.7, 230; 416/189, 192

[56] References Cited

U.S. PATENT DOCUMENTS

| | | | |
|---|---|---|---|
| 4,466,772 | 8/1984 | Okapuu et al. | 415/172 A |
| 4,714,406 | 12/1987 | Hough | 415/170 R |
| 5,232,338 | 8/1993 | Vincent de Paul et al. | 415/144 |
| 5,328,326 | 7/1994 | Gros et al. | 415/115 |
| 5,547,340 | 8/1996 | Dalton et al. | 415/121.2 |

FOREIGN PATENT DOCUMENTS

| | | |
|---|---|---|
| 0 509 921 | 10/1992 | European Pat. Off. . |
| 0 799 973 | 10/1997 | European Pat. Off. . |
| 976791 | 3/1951 | France . |
| 35 23 469 | 1/1987 | Germany . |
| 529 914 | 12/1972 | Switzerland . |
| 2 119 027 | 11/1983 | United Kingdom . |
| 2 233 401 | 1/1991 | United Kingdom . |

OTHER PUBLICATIONS

Japanese Patent Abstract No. 58113504 (Eijirou), dated Jul. 6, 1983.
"Loss Mechanism In Turbo Machines" (Denton), The American Society of Mechanical Engineers, 93–GT–435, pp. 1–40.

*Primary Examiner*—Edward K. Look
*Assistant Examiner*—Ninh Nguyen
*Attorney, Agent, or Firm*—Herbert L. Lerner; Laurence A. Greenberg

[57] ABSTRACT

A turbine, in particular a steam turbine, has a gap between a head region of a first turbine blade and a turbine component. The gap is followed downstream by a limiting surface which is inclined by an acute angle relative to a rotational axis of the turbine and is formed, at least in some regions, by the turbine component. The first turbine blade is followed by a second turbine blade which has a blade region with a radial offset relative to the blade region of the first turbine blade. The turbine component or the head region in the sealing gap additionally or alternatively has an indentation for deflecting a flow of an action fluid in the sealing gap by a circumferential angle in circumferential direction. A turbine blade includes a head region having a circumferential surface substantially perpendicular to a blade axis. The circumferential surface has at least one indentation for flow deflection substantially by a circumferential angle. A blade region adjoins said head region for deflecting an action fluid by the circumferential angle.

14 Claims, 4 Drawing Sheets

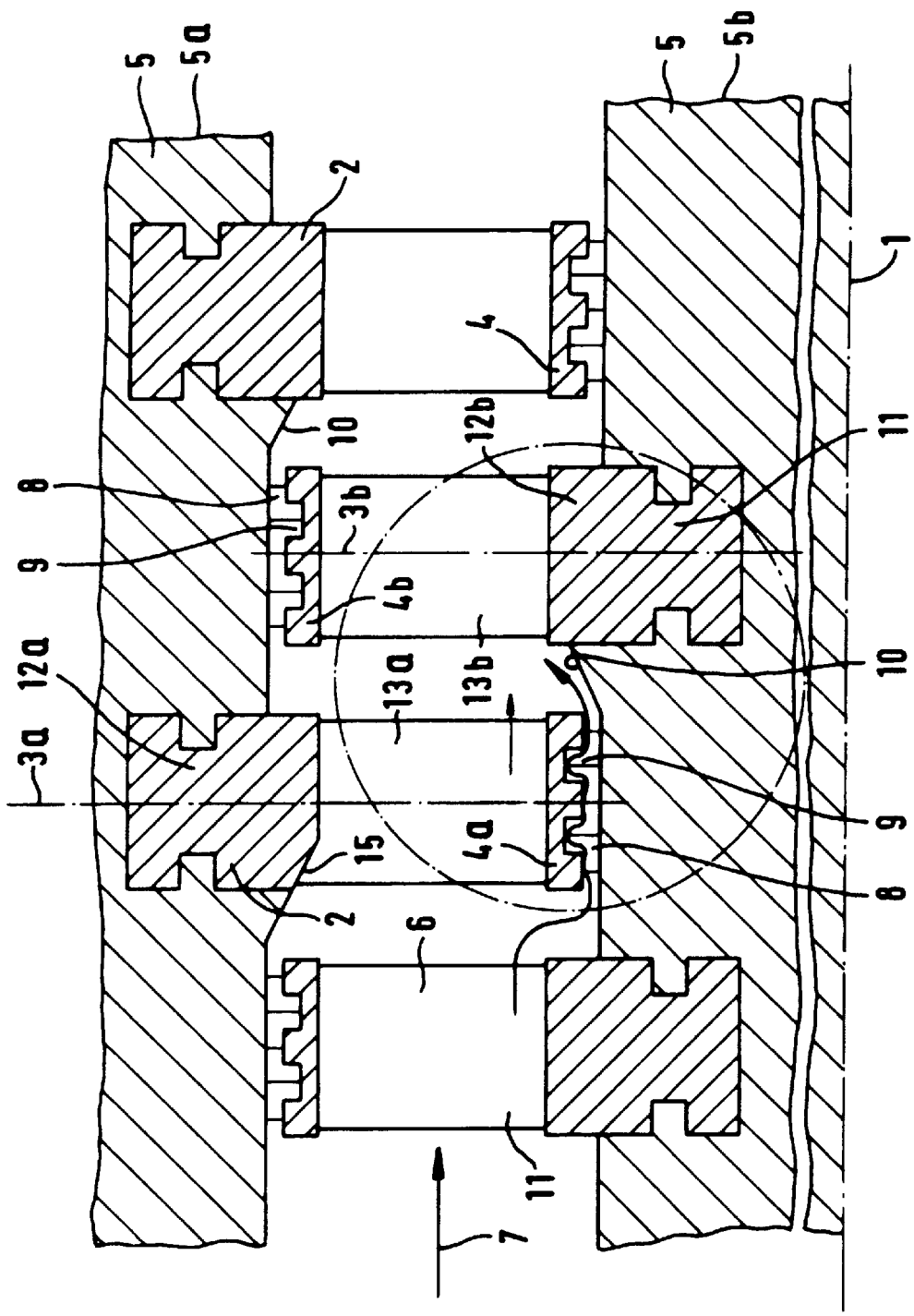

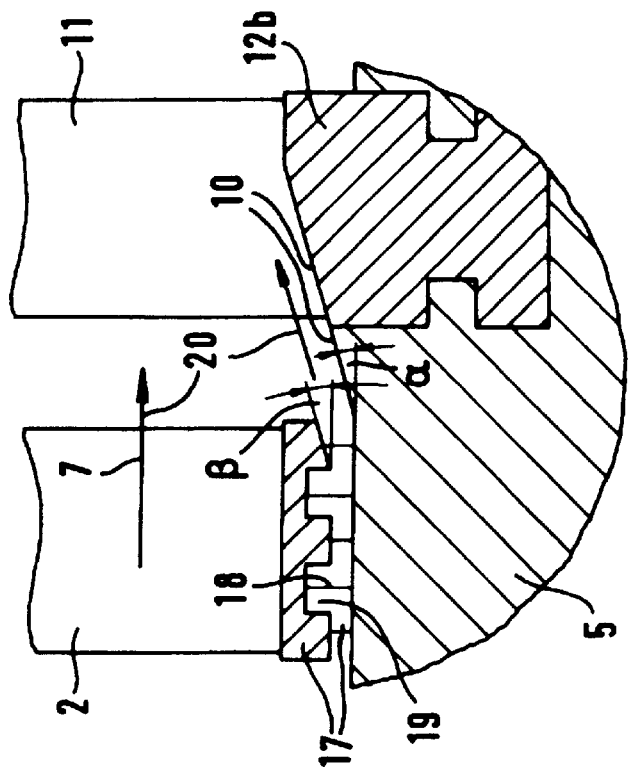
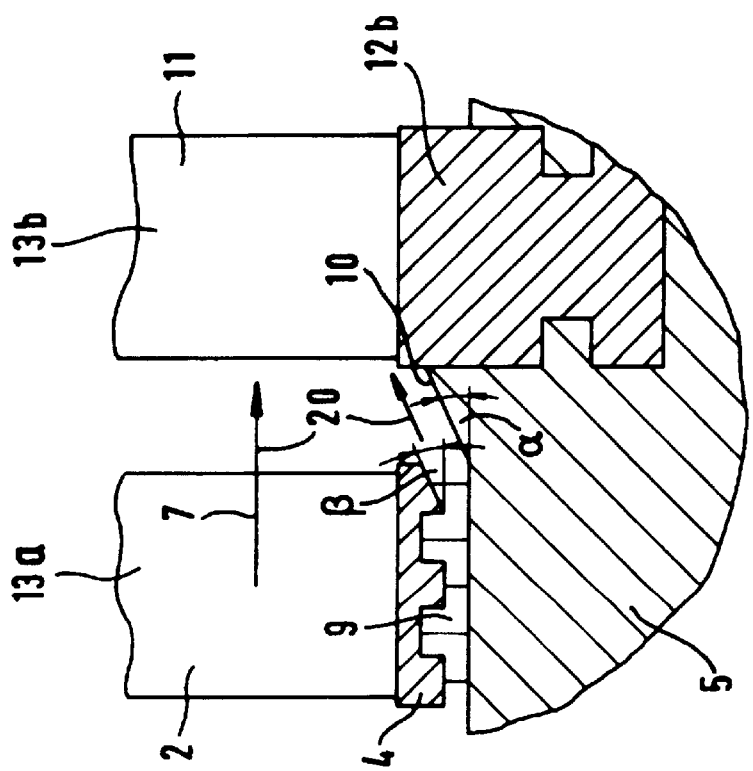

TURBINE, IN PARTICULAR STEAM TURBINE, AND TURBINE BLADE

BACKGROUND OF THE INVENTION

Field of the Invention

The invention relates to a turbine, in particular a steam turbine, which is oriented along a rotational axis and includes a turbine blade. The turbine blade is oriented along a blade axis and has a head region and a blade region adjoining the head region. The steam turbine also includes a turbine component extended along the rotational axis, a mainstream course with a mainstream direction, and a gap flow course communicating fluidically with the mainstream course and leading through a sealing gap between the head region and the turbine component. The blade region makes it possible to deflect an action fluid, which can be carried through the mainstream course, by a circumferential angle. The invention also relates to a turbine blade that is oriented along a blade axis and has both a head region and a blade region adjoining the head region. The blade region deflects an action fluid by a circumferential angle.

An impulse or action steam turbine with a rotor, a stator and a plurality of stages is described in European Patent 0 509 921 B1. Each stage has one fixed set of blades and one movable set of blades. The fixed set of blades accomplishes more than 85% of a pressure drop at the base of each stage. The movable set of blades is mounted directly on the rotor. The fixed set of blades has a shroud on an inner ring, with a base diameter that is substantially equivalent to the diameter of the rotor. A seal is also provided, for sealing off the stationary set of blades from the rotor. European Patent 0 509 921 B1 discloses a plurality of different embodiments both for the seal and for a flow course of fluid emerging from the seal. In one embodiment, both the shroud on a downstream side and a guide blade following the shroud, in a root region, are chamfered so that fluid flowing through the seal flows essentially axially into a mainstream of the fluid.

A wall contour for an axial turbomachine is described in later-published European Patent Application 0 799 973 A1. In particular, the wall contour pertains to a channel contour in the bladed region of a steam turbine and can be used for sets of blades that have tip seals or those which have shroud plates or shroud plate seals. European Patent Application 0 799 973 A1 describes provisions that are intended to improve a reentering flow of a labyrinthine mass flow between a rotor blade and the wall contour. The shroud band of the rotor blade or the shroud band of the guide blade is lengthened in the axial direction in that case and cut in such a way that a labyrinth exit is radially as narrow as possible, to avoid unnecessary dissipation. Due to the lengthening of the shroud plate, the outflow from the labyrinth can occur as close as possible to the following guide blade inlet.

In Patent Abstracts of Japan, Vol. 007, No. 221 (M-246), Sept. 30, 1983, for Japanese Patent Application published under No. 58 113504, a plurality of slots are disposed in a housing of an axial turbomachine. Those slots have a rectangular cross section. The slots are shaped in such a way that at each end point of a rotor blade adjacent the housing, the direction at every point of the slot agrees with the direction of the absolute velocity vector of the fluid at the end of each point of the rotor blade.

Swiss Patent 529 914 discloses a turbine stage of a turbine which is used, for instance, for driving an electrical generator or an aircraft engine. An intermediate space is formed between a false bottom of a guide blade and a rotor disk, through which a leakage flow of operating medium can flow. In a transitional region from the intermediate space to the rotor blade, a protrusion is provided, which is constructed in the form of a ring and partly covers the root surface of the rotor blade. As a result, an annular gap is formed with the root surface for the passage therethrough of some of the operating medium, referred to as a leakage flow. Grooves are constructed on an inside surface of the protrusion and extend at an angle that is identical to the exit angle of the guide blade. Providing the oblique grooves on the inside surface of the protrusion lends the leakage flow a spin toward the side of the rotation of the rotor wheel of the turbine stage. The swirling leakage flow leads energy to the utilization of the leakage flow at the rotor blades of the rotor, which is intended to increase the efficiency of the turbine stage.

In an article by J. D. Denton, entitled "Loss Mechanisms in Turbomachines" in ASME Paper 93-GT-439, 1993, the American Society of Mechanical Engineers, various loss mechanisms that reduce the efficiency of a steam turbine are described, and a quantitative and qualitative assessment of those losses is provided. A substantial proportion of the loss, that counts as one of the causes of fluidic loss, is due to what is known as gap loss, which can amount to up to about 30% of the total loss. The gap loss arises upon a flow through a sealing portion between a fixed component and a rotating component of the steam turbine. The fluid flowing through the sealing portion then re-enters the mainstream of the fluid. The sealing portion acts in that case to seal off the rotating component from the fixed component, for instance in order to seal off a rotor blade from the turbine housing and a guide blade from the turbine shaft. The magnitude of the gap loss is proportional, among other things, to the proportion of the mass flow flowing through the seal to the main mass flow, depending on the velocity ratio of the fluid in the gap and in the mainstream and on the angle at which the fluid emerges from the gap into the mainstream. According to Denton, the latter, because of the difference in temperature and velocity between the mainstream and the gap flow, leads to a temperature increase and thus to an additional loss of efficiency.

SUMMARY OF THE INVENTION

It is accordingly an object of the invention to provide a turbine, in particular a steam turbine, and a turbine blade, which overcome the hereinafore-mentioned disadvantages of the heretofore-known devices of this general type and in which the turbine has a reduction in gap loss in a gap between a turbine blade and a turbine component and the turbine blade reduces the gap loss.

With the foregoing and other objects in view there is provided, in accordance with the invention, a turbine, in particular a steam turbine, oriented along a rotational turbine axis, comprising a first blade axis and a second blade axis; a first turbine blade oriented along the first blade axis and having a head region and a blade region adjoining the head region; a turbine component extended along the rotational axis and defining a sealing gap with the head region; a mainstream course with a mainstream direction; a gap flow course communicating fluidically with the mainstream course and leading through the sealing gap; a second turbine blade disposed downstream of the first turbine blade, extended along the second blade axis and having a blade region and a root region adjoining the blade region and secured in the turbine component; the blade regions of the first and second turbine blades having a mutual radial height offset; and a limiting surface disposed in the gap flow course downstream of the sealing gap in the mainstream direction, the limiting surface inclined on average at an acute angle relative to the rotational axis.

In accordance with another feature of the invention, at least in some regions, the limiting surface is formed by the turbine component.

In accordance with a further feature of the invention, the limiting surface, at least in some regions, demarcates the root region from the blade region.

An application of the invention to a gas turbine is equally conceivable. The limiting surface is preferably provided between two adjacent turbine blades. However, it may also be provided entirely or in part in the sealing gap and/or on a downstream turbine blade.

In accordance with an added feature of the invention, as an alternative or in addition to the limiting surface, the blade region of the first turbine blade is constructed for deflecting an action fluid, which can be carried through the mainstream course, by a circumferential angle, and the turbine component and/or the first turbine blade has a circumferential surface, defining the gap flow course, and at least one indentation in the circumferential surface for deflecting the flow, again substantially by the circumferential angle $\gamma$.

With the turbine according to the invention, the gap flow course that is constructed in particular as a gap seal is constructed on the outlet side by a geometrical and structural embodiment of the turbine blade, in particular a guide blade or rotor blade, and the turbine component is constructed fluidically in such a way that an improvement in reentry of the fluid flowing through the gap flow course into the action fluid flowing along the mainstream direction is assured.

A mean degree of reaction of a turbine stage of the turbine and a local degree of reaction, dependent on the blade height, in the region of the gap flow course constructed as a gap seal are adjustable, depending on technical requirements. The turbine may be constructed axially, diagonally, radially, or in a mixture thereof. Cylindrical or arbitrarily three-dimensionally shaped turbine blades can be used as the turbine blade.

In order to improve the reentry of the action fluid flowing through the gap flow course into the mainstream of action fluid, various structures of the head region of the first turbine blade, the turbine component, the turbine shaft or the turbine housing and of the root region of the second turbine blade downstream of the first turbine blade are disclosed in advantageous embodiments of the turbine according to the invention.

In accordance with an additional feature of the invention, the angular difference, that is the acute angle $\alpha$ between the gap flow reentering the meridional mainstream, is between 0° and 90°, depending on technical requirements, and in particular is below 45°. The acute angle a is preferably in a range between 5° and 25°, and in particular is 10°. The limiting surface may be inclined as a flat surface by the acute angle $\alpha$ or depending on the embodiment it may also extend in a continuously and optionally steadily, curved manner. On average, the acute angle $\alpha$ is associated with the limiting surface.

In accordance with yet another feature of the invention, there is provided a sealing system with axially spaced-apart sealing tips in the sealing gap. The sealing tips preferably engage a corresponding sealing indentation in the head region or in the turbine component. Virtually arbitrary sealing systems are possible, such as those described in European Patent 0 509 921 B1. The turbine may have either a drum-type or chambered structure.

The first guide blade, together with a plurality of first guide blades, forms a guide blade ring. The guide blade ring forms a respective turbine stage with a rotor blade ring axially downstream and likewise symmetrical with the rotational axis. The head regions of the turbine blades of a turbine blade ring preferably form a shroud band. The shroud band preferably has indentations axially downstream of one another that are rotationally symmetrical to the rotational axis.

The mainstream of action fluid is moved past the blade region and is deflected by it by a circumferential angle $\gamma$. This creates a local flow direction of the mainstream with a circumferential component. Indentations with a circumferential component are provided, preferably in the sealing gap at the head region and/or at the turbine component, so that a deflection of the action fluid flowing through the gap flow course is again effected, especially by the circumferential angle. An inflow of the gap mass flow into the main mass flow therefore takes place substantially with the same circumferential component, so that as a result an additional friction loss is averted. A loss of efficiency from the inflow into the mainstream is markedly reduced with the adaptation of the orientation of the gap flow to the meridional mainstream direction through the use of an inflow at the acute angle $\alpha$.

In accordance with yet a further feature of the invention, the head region is chamfered on the downstream side, again on average by the acute angle $\alpha$ of the limiting surface. An additional improvement in the inflow of the gap into the mainstream of action fluid is thereby attainable.

In accordance with yet an added feature of the invention, the first turbine blade is a guide blade and the turbine component is a turbine shaft, or else the first turbine blade is a rotor blade and the turbine component is a turbine housing.

In accordance with yet an additional feature of the invention, the first turbine blade has a root region, which on the inlet side has a limiting surface toward the blade region that is inclined on average by the acute angle $\alpha$. This leads to a lessening of the inlet loss in a gap stream, which flows through between a second turbine blade, preceding the first turbine blade, and a turbine component adjoining the second turbine blade. As a result, the losses from a reentrance into the mainstream of guide blade rings and rotor blade rings that succeed one another in alternation can be reduced.

With the objects of the invention in view there is also provided a turbine blade oriented along a blade axis, comprising a head region having a circumferential surface substantially perpendicular to the blade axis, the circumferential surface having at least one indentation for flow deflection substantially by a circumferential angle; and a blade region adjoining the head region for deflecting an action fluid by the circumferential angle.

The turbine blade is preferably used in a rotationally symmetrical blade ring including a plurality of substantially identical turbine blades. The head regions of the turbine blades form a shroud band in which a plurality of indentations assure a deflection of an action fluid, flowing along the head region, by the circumferential angle.

In accordance with a concomitant feature of the invention, the indentation is inclined on average by an acute angle relative to a rotational axis perpendicular to the blade axis.

Other features which are considered as characteristic for the invention are set forth in the appended claims.

Although the invention is illustrated and described herein as embodied in a turbine, in particular a turbine blade, it a turbine blade, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a fragmentary, diagrammatic, longitudinal-sectional view of an impulse steam turbine of the drum type;

FIG. 2 is an enlarged view of a portion of FIG. 1 enclosed by a dot-dash circle;

FIGS. 3, 4 and 5 are views similar to FIG. 2, each showing a different alternative embodiment;

DESCRIPTION OF THE PREFERRED EMBODIMENTS

Figure 5:
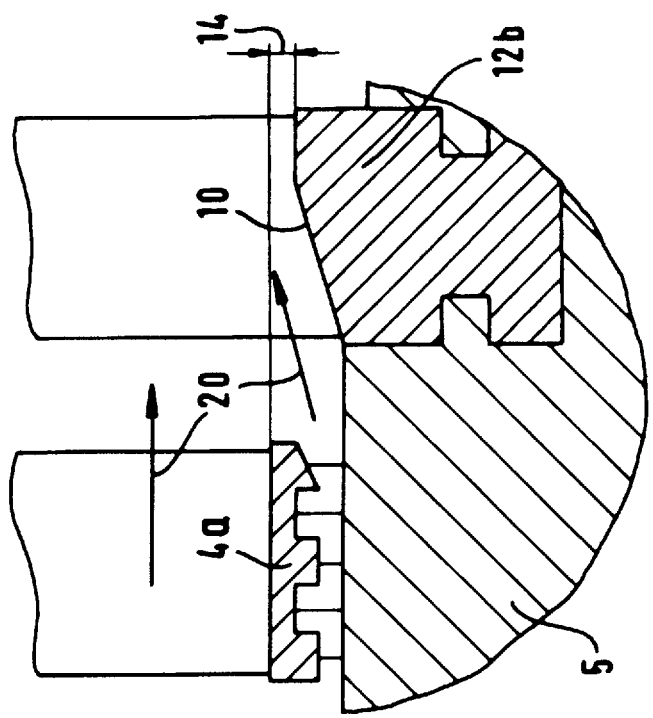

Referring now in detail to the figures of the drawings, in which the reference numerals used therein all have the same meaning in each case, and first, particularly, to FIG. 1 thereof, there is seen a fragmentary, longitudinal section through part of an impulse or action steam turbine of the drum type, which is oriented along a rotational axis 1. The steam turbine has a turbine housing 5a and a turbine shaft 5b as its turbine components oriented along the rotational axis 1.

Axially spaced-apart first turbine blades (guide blades) 2 are disposed in the turbine housing 5a in a respective guide blade ring that is rotationally symmetrical to the rotational axis 1. Each guide blade 2 is oriented along a respective blade axis 3a and has a root region 12a, an adjoining blade region 13a, and a head region 4a along the blade axis 3a. The guide blade 2 is secured to the housing 5a by the root region 12a.

A respective second turbine blade (rotor blade) 11 which is disposed between each two axially spaced-apart guide blades 2, is connected to the turbine shaft 5b. Each rotor blade 11 is oriented along a respective blade axis 3b from a root region 12b through a blade region 13b. Each rotor blade 11 is connected to the turbine shaft 5b by its root region 12b.

A mainstream course 6 extends through the circumferentially spaced-apart blade regions 13a of each guide blade ring of guide blades 2. Action fluid 20 indicated in FIGS. 2–6, for driving the rotor blades 11, can be carried along the mainstream course 6 through the steam turbine. The action fluid 20 flows through the mainstream course 6 along a mainstream direction 7, which extends substantially parallel to the rotational axis 1.

Figure 6:
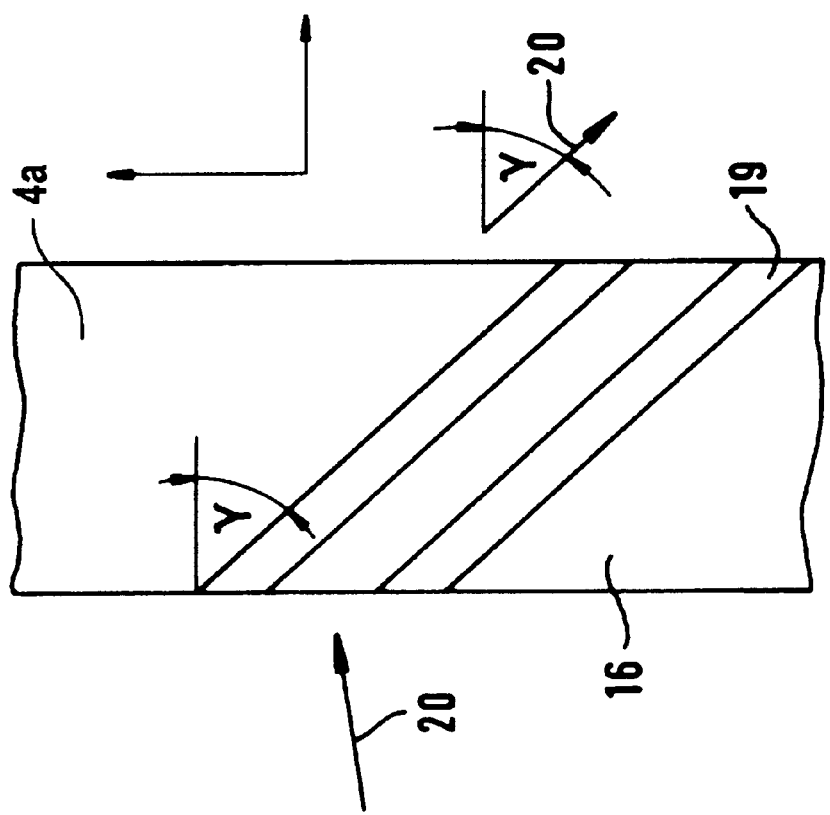
FIG. 6 is a fragmentary, developed view, of a shroud band of a guide blade ring.

A circular-annular sealing gap 9 is formed between the head region 4a of the first turbine blade (guide blade) 2 and the turbine shaft 5b, as well as between the head region 4b of a second turbine blade (rotor blade) 11, and the turbine housing 5a. This sealing gap 9 is part of a gap flow course 8, through which some of the action fluid 20 flows, without performing work at the rotor blades 11 and without being deflected accordingly by a circumferential angle γ in the guide blades 2 over the blade region 13a, as is seen in FIG. 6. This action fluid 20, which is flowing through the gap flow course 8 and is also referred to as a gap flow, causes a loss of efficiency of the steam turbine. In order to reduce this loss of efficiency, a sealing system 17 is provided in each sealing gap 9, as is seen in FIG. 3. The system includes sealing tips 18 that are spaced axially apart from one another and sealing indentations 19 which extend circumferentially in a respective head region 4a, 4b. Some of the sealing tips 18 extend from the respective turbine component 5a, 5b into a respective sealing indentation 19. The action fluid 20 flows back out of the gap flow course 8 into the mainstream course 6 downstream of the respective sealing gap 9. This inflow occurs essentially with a flow orientation that is inclined by an acute angle α relative to both the mainstream direction 7 and the rotational axis 1.

To that end, a limiting surface 10 is provided downstream of each sealing gap 9, as is seen in FIG. 1 and FIG. 2, for instance. The limiting surface 10 leads from the gap 9 to a respective root region 12a, 12b and is a flat surface which forms the acute angle α with the mainstream direction 7. The limiting surface 10 may also be constructed in a curved manner, having the acute angle α on average. The acute angle α is preferably in the range of 10°. In addition, the head region 4a of the first turbine blade 2 in FIG. 2 is chamfered on the outlet side by an angle β, which substantially agrees with the acute angle α. As a result, even before emerging from the sealing gap 9, the gap flow is given a flow component for an inflow into the mainstream or the main flow of the action fluid 20, flowing through the mainstream course 6.

In the embodiment shown in FIG. 3, the limiting surface 10 extends into the root region 12b of the second turbine blade or rotor blade 11, and as a result a shallower inflow than in FIG. 2 for the gap flow into the main flow is attainable.

Figure 4:
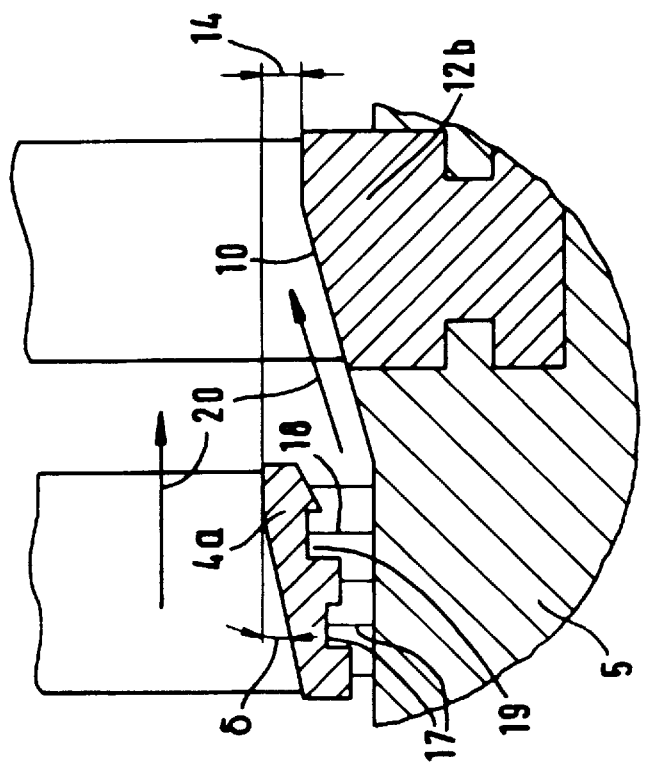

In the embodiment shown in FIG. 4, the limiting surface 10 extends from the turbine shaft 5b into the root region 12b. There is a height offset 14 in the radial direction between the blade region 12b and the head region 4a of the guide blade 2, as a result of which the angle α can also be small, and therefore a substantially virtually axial inflow of the gap flow into the main flow of the action fluid 20 is accomplished. As a result, there is also an offset between the blade region 13a of the guide blade 2 and the blade region 13b of the rotor blade 11. The head region 4a is chamfered on the inflow side at an angle δ, which is preferably equivalent to the acute angle α. As a result, a reentrance of the gap flow from a sealing gap 9 of a second turbine stage 11, axially preceding the first turbine blade 2, into the main flow at low flow resistance, is possible.

In the embodiment of FIG. 5, once again there is a height offset 14 between the head region 4a and the root region 12b. The limiting surface 10 extends solely along the root region 12b.

FIG. 6 is a developed view which shows a circumferential surface 16 of the head region 4a of the first turbine blades or guide blades 2 that are joined together in the circumferential direction to form a guide blade ring, in which the head regions 4a are combined into a shroud band. The head region 4a has spaced-apart indentations 19, only two of which are shown for the sake of simplicity, that assure a deflection of the gap flow by an angle γ in the sealing gap 9. In FIG. 6, the indentations 19 are shown as straight indentations, but it is understood that they may also be curved and in particular adapted to the blade profile of the blade region 13a. The circumferential angle γ is substantially equivalent to the circumferential angle that the action fluid 20 undergoes as its flows through the profiled region 13a. The flow orientation of the action fluid 20 both downstream and upstream of the turbine blade 2 is indicated by a respective arrow.

Figure 7:
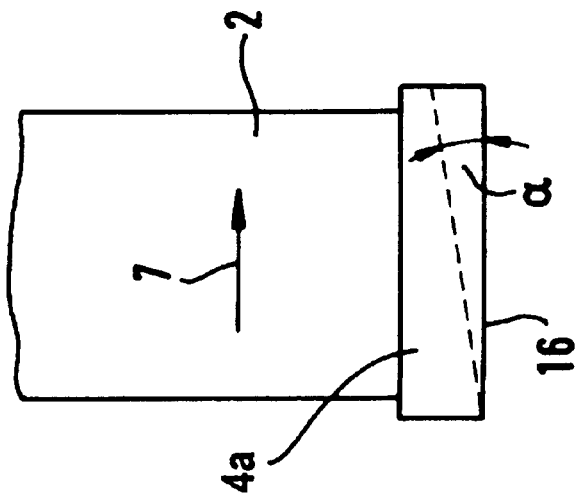
FIG. 7 is a fragmentary, longitudinal-sectional view of a guide blade with a head region.

In FIG. 7, each indentation 19 in the head region 4a is inclined by the acute angle α in the mainstream direction 7. The indentations 19 accomplish an adaptation of the gap flow to the main flow, both in the axial direction and in the circumferential direction.

The invention is distinguished by a turbine, in particular a steam turbine, in which an adaptation of the gap flow is attained, both in the axial direction through a limiting surface downstream of the gap and in the circumferential direction through indentations in a shroud band and/or a turbine component adjoining the gap. As a result, an efficiency loss resulting from the reentrance of the gap flow into a mainstream of action fluid is markedly reduced.

I claim:

1. A turbine, comprising:
   a) a rotational turbine axis and a blade axis;
   b) a mainstream course with a mainstream direction;
   c) a turbine blade oriented along said blade axis and having a head region and a blade region adjoining said head region, said blade region inclined by a circumferential angle in a circumferential direction relative to said rotational turbine axis, for deflecting an action fluid to be guided through said mainstream course;
   d) a turbine component extended along said rotational turbine axis and defining a gap with said head region;
   e) at least one of said turbine component and said turbine blade having a circumferential surface defining a gap flow course communicating fluidically with said mainstream course and leading through said gap, said circumferential surface having at least one indentation for flow deflection inclined substantially by said circumferential angle; and
   f) a limiting surface in said gap flow course, said limiting surface inclined on average at an acute angle relative to said rotational turbine axis.

2. The turbine according to claim 1, wherein said indentation is inclined on average by said acute angle in axial direction.

3. The turbine according to claim 1, including a sealing system in said sealing gap.

4. The turbine according to claim 1, including sealing tips in said sealing gap.

5. The turbine according to claim 3, wherein said head region is oriented toward said gap and has at least one sealing indentation.

6. The turbine according to claim 1, wherein said head region has a downstream side inclined on average by said acute angle widening said gap relative to said rotational turbine axis.

7. The turbine according to claim 1, wherein said turbine blade has a root region with a further limiting surface inclined by said acute angle relative to said rotational axis.

8. The turbine according to claim 1, wherein said head region has an oncoming flow side inclined and oriented toward said blade region from said rotational axis on average by an acute oncoming flow angle.

9. The turbine according to claim 1, wherein said turbine blade is a guide blade and said turbine component is a turbine shaft.

10. The turbine according to claim 1, wherein said turbine blade is a rotor blade and said turbine component is a turbine housing.

11. A turbine blade, comprising:
   a blade axis;
   a head region having a circumferential surface substantially perpendicular to said blade axis, said circumferential surface having at least one indentation for flow deflection inclined substantially by a circumferential angle; and
   a blade region adjoining said head region for deflecting an action fluid by said circumferential angle.

12. The turbine blade according to claim 11, wherein said indentation is inclined on average by an acute angle relative to a rotational axis perpendicular to said blade axis.

13. A drum type turbine, comprising:
   a rotational turbine axis and a blade axis;
   a mainstream course with a mainstream direction;
   a turbine blade oriented along said blade axis and having a head region and a blade region adjoining said head region, said blade region inclined by a circumferential angle in a circumferential direction relative to said rotational turbine axis, for deflecting an action fluid to be guided through said mainstream course;
   a turbine component extended along said rotational turbine axis and defining a gap with said head region;
   at least one of said turbine component and said turbine blade having a circumferential surface defining a gap flow course communicating fluidically with said mainstream course and leading through said gap, said circumferential surface having at least one indentation for flow deflection inclined substantially by said circumferential angle; and
   a limiting surface in said gap flow course, said limiting surface inclined on average at an acute angle relative to said rotational turbine axis.

14. The turbine according to claim 1, wherein said turbine blade is a first turbine blade, and including a second turbine blade having a second blade axis, said second turbine blade being disposed downstream of said first turbine blade, extended along said second blade axis, and having a second blade region and a root region adjoined to said second blade region and secured in said turbine component, said blade region and said second blade region having a mutual radial height offset.

* * * * *